(12) United States Patent
Belyy et al.

(10) Patent No.: US 10,275,234 B2
(45) Date of Patent: Apr. 30, 2019

(54) SELECTIVE BYPASS OF CODE FLOWS IN SOFTWARE PROGRAM

(71) Applicant: SAP SE, Walldorf (DE)

(72) Inventors: Andrey Belyy, Sunnyvale, CA (US); Ajit Dash, Cupertino, CA (US); Wai-Ming Ng, Sunnyvale, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/724,288

(22) Filed: May 28, 2015

(65) Prior Publication Data

US 2016/0350209 A1 Dec. 1, 2016

(51) Int. Cl.
*G06F 9/44* (2018.01)
*G06F 8/70* (2018.01)
*G06F 11/36* (2006.01)
*G06F 9/445* (2018.01)

(52) U.S. Cl.
CPC ............ *G06F 8/70* (2013.01); *G06F 9/44505* (2013.01); *G06F 11/3624* (2013.01)

(58) Field of Classification Search
CPC .......................... G06F 11/3624; G06F 11/3664
See application file for complete search history.

(56) References Cited

U.S. PATENT DOCUMENTS

| | | | | |
|---|---|---|---|---|
| 2004/0012632 A1* | 1/2004 | King | ................... | G06F 8/443 715/763 |
| 2004/0210876 A1* | 10/2004 | Stall | ................... | G06F 11/3624 717/127 |
| 2005/0229154 A1* | 10/2005 | Hiew | ................... | G06F 8/34 717/110 |
| 2008/0148219 A1* | 6/2008 | Ousterhout | ............... | G06F 8/71 717/101 |
| 2008/0168082 A1* | 7/2008 | Jin | ................... | G06F 8/20 |
| 2010/0017788 A1* | 1/2010 | Bronkhorst | .......... | G06F 11/3664 717/125 |
| 2011/0117868 A1* | 5/2011 | Vahidfar | .............. | H03G 3/3052 455/226.2 |
| 2013/0238550 A1* | 9/2013 | Mandelstein | ..... | G06F 17/30563 707/602 |

* cited by examiner

*Primary Examiner* — Li B. Zhen
*Assistant Examiner* — Lenin Paulino
(74) *Attorney, Agent, or Firm* — Fountainhead Law Group P.C.

(57) ABSTRACT

Embodiments relate to systems and methods allowing selective bypass of code flows in computer software. According to particular embodiments, a bypass attribute is introduced into code flows (e.g., present for development and/or testing purposes only) that are to be disabled prior to releasing the final operational version of the software. A value for the bypass attribute is determined at single, a central engine. Based upon that bypass attribute value, the code flow is either executed or bypassed. In certain embodiments the bypass attribute is implemented in the form of a substitute variable. In some embodiments the bypass attribute is implemented in the form of a code flow call. The bypass attribute may operate in a sequential manner, such that execution of other downstream code flows is also bypassed. One example is provided in the form of bypassing code flows of an Extract, Transform, Load (ETL) process.

11 Claims, 12 Drawing Sheets

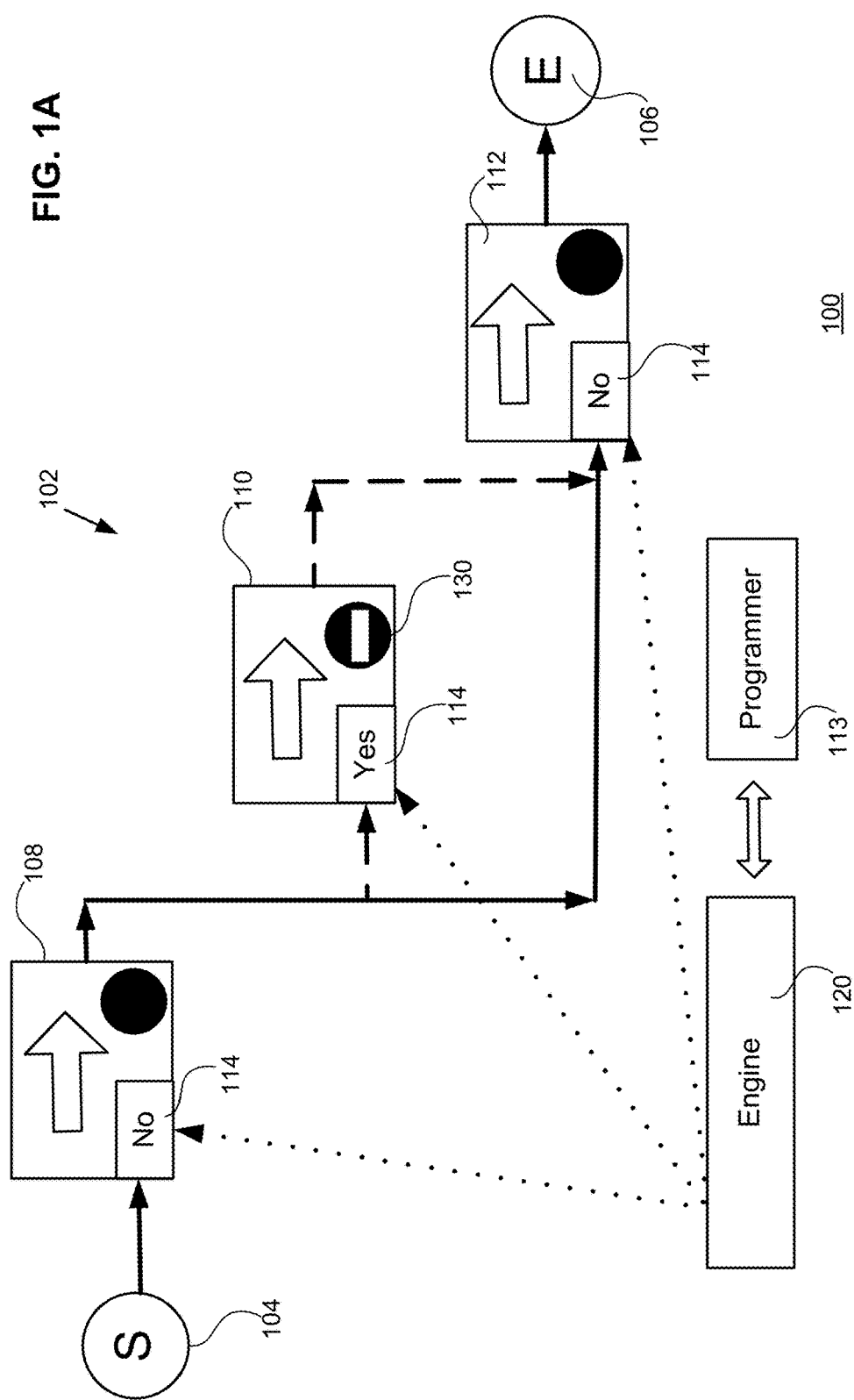

SELECTIVE BYPASS OF CODE FLOWS IN SOFTWARE PROGRAM

BACKGROUND

Unless otherwise indicated herein, the approaches described in this section are not prior art to the claims in this application and are not admitted to be prior art by inclusion in this section.

Embodiments relate to software programming, and in particular, to the insertion of codes allowing selective bypass of code flows, e.g., as may be inserted for development/testing purposes only.

A typical use case in a customer scenario, is to debug a certain code flow within an overall job. This is sought to be done without having to run all the code flows within the entire job each time—a time consuming process.

Conventionally, a user may insert a "Conditional" clause (e.g., if/else) in order to bypass the code flow that is desired not to be run. However, this approach offers the disadvantage of requiring the user to later return to the code in order to manually remove the if/else for the production mode.

SUMMARY

Embodiments relate to systems and methods allowing selective bypass of code flows in computer software. According to particular embodiments, a bypass attribute is introduced into code flows (e.g., present for development and/or testing purposes only) that are to be disabled prior to releasing the final operational version of the software. A value for the bypass attribute is determined at single, a central engine. Based upon that bypass attribute value, the code flow is either executed or bypassed. In certain embodiments the bypass attribute is implemented in the form of a substitute variable. In some embodiments the bypass attribute is implemented in the form of a code flow call. The bypass attribute may operate in a sequential manner, such that execution of other downstream code flows is also bypassed. One example is provided in the form of bypassing code flows of an Extract, Transform, Load (ETL) process.

An embodiment of a computer-implemented method comprises an engine in communication with a first attribute of a first code flow. The engine receives a user input. In response to the user input, the engine changes the first attribute to result in bypassing of execution of the first code flow. The first code flow is displayed in an interface indicating a bypassed status of the first code flow.

A non-transitory computer readable storage medium embodies a computer program for performing a method comprising displaying an interface comprising a first code flow and a second code flow downstream of the first code flow. An engine is in communication with a first attribute of a first code flow. The engine receives a user input. In response to the user input, the engine changes the first attribute to result in bypassing of execution of the first code flow. The first code flow is displayed in the interface indicating a bypassed status of the first code flow.

An embodiment of a computer system comprises one or more processors and a software program executable on said computer system to cause an engine to display an interface comprising a first code flow and a second code flow downstream of the first code flow. The software program is configured to cause the engine to receive a user input. In response to the user input, the engine changes the first attribute to result in bypassing of execution of the first code flow. The engine displays the first code flow in the interface indicating a bypassed status of the first code flow. An entry in a trace log is generated indicating the bypassing of execution of the first code flow.

In certain embodiments the first attribute comprises a substitution variable.

In some embodiments the first attribute comprises a code flow call.

According to particular embodiments changing the first attribute also results in bypassing of execution of a second code flow downstream of the first code flow.

In various embodiments the bypass attribute does not also cause bypassing of execution of a second code flow downstream of the first code flow, and the engine is further in communication with a second attribute of the second code flow.

Certain embodiments further comprise the engine generating an entry in a trace log indicating the bypassing of execution of the first code flow.

In some embodiments the first code flow comprises an Extract, Transform, Load (ETL) function.

In particular embodiments the first code flow is present within a loop.

In certain embodiments the first code flow is nested.

The following detailed description and accompanying drawings provide a better understanding of the nature and advantages of embodiments.

BRIEF DESCRIPTION OF THE DRAWINGS

FIG. 1A shows a simplified view of a system according to an embodiment.

DETAILED DESCRIPTION

Figure 1B:
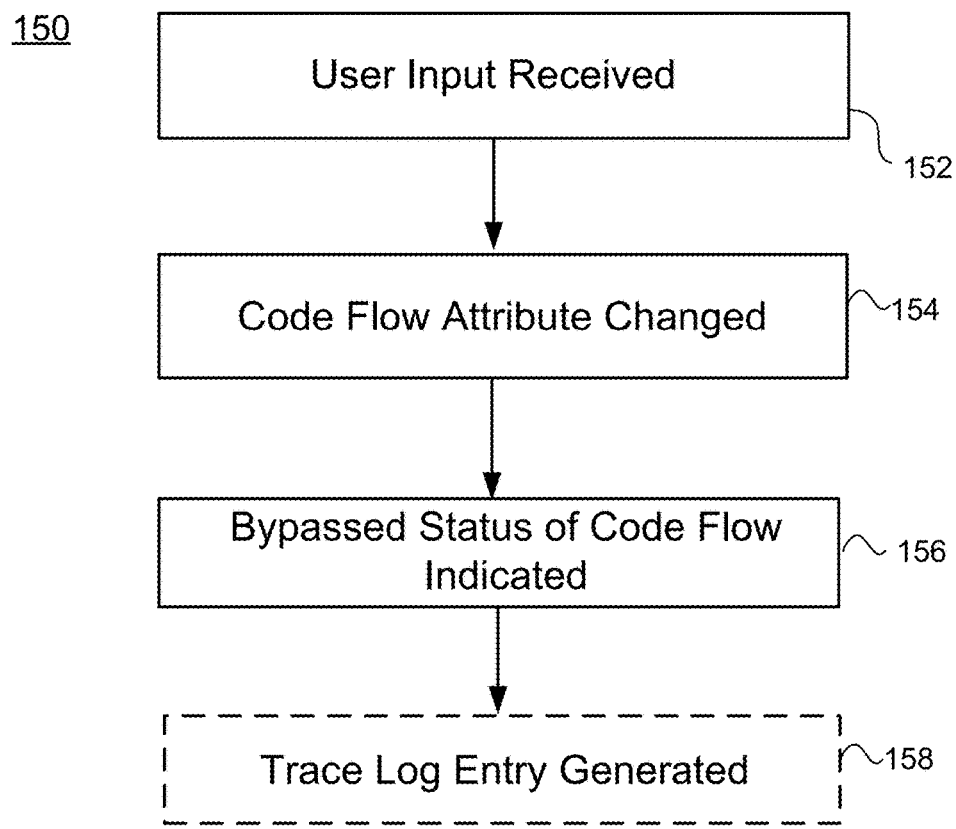
FIG. 1B is a simplified process flow according to an embodiment.

Described herein are systems and methods allowing selective bypassing of code flows according to various embodiments. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments relate to systems and methods allowing selective bypass of code flows in computer software. According to particular embodiments, a bypass attribute is introduced into code flows (e.g., present for development and/or testing purposes only) that are to be disabled prior to releasing the final operational version of the software. A value for the bypass attribute is determined at single, a central engine. Based upon that bypass attribute value, the code flow is either executed or bypassed. In certain embodiments the bypass attribute is implemented in the form of a substitute variable. In some embodiments the bypass attribute is implemented in the form of a code flow call. The bypass attribute may operate in a sequential manner, such that execution of other downstream code flows is also bypassed. One example is provided in the form of bypassing code flows of an Extract, Transform, Load (ETL) process.

FIG. 1A presents a simplified view of a system 100 according to an embodiment. In particular, a software program 102 includes executable code commencing at a starting point 104, and concluding at an ending point 106.

The software program comprises code flows 108, 110, and 112 which may be separately executable. Under certain circumstances, a programmer 113 may include a particular code flow in the software program for purposes of development and/or testing only. That is, such a code flow is not intended to be actually executed by the operating software program upon its release.

Thus, the programmer may introduce within one or more code flows, an attribute 114 that allows selective bypassing of particular code flows during program operation. Here, the code flow 110 represents one that has been introduced into the software program for development and/or testing purposes only. That code flow 110 is sought to be disabled prior to actual operation of the software program by an ordinary user.

Accordingly, the programmer communicates with an engine 120, to populate the bypass attribute 114 with a particular value to achieve a desired result. In FIG. 1A, development and/or testing of the software program has been completed. Therefore, the value of the bypass attribute of the code flows 108 and 112 is set to "No", indicating that those code flows are not to be bypassed.

By contrast, the value of the bypass attribute of the code flow 110 is set to "Yes" by the programmer via the engine. This indicates that code flow 110 is to be bypassed and not executed during operation of the software program. The status of this code flow as "to-be-bypassed", is indicated in the interface by an icon 130 (here a "do not enter" symbol).

In the manner shown in FIG. 1A, a programmer may thus access the engine as a single, centralized point of access in order to control the selective bypass of code flows within a computer program.

The simplified view of FIG. 1A shows bypassing of code flows in a parallel mode. That is, the bypassing of the code flow 110 based upon to the value of the attribute, does not necessarily affect execution of the code flow 112 that is located downstream.

However, this is not required, and alternative embodiments may operate in a sequential mode. That is, the bypassing of the code flow 110 based upon the value of the attribute, may automatically also preclude execution of downstream code flows (e.g., code flow 112).

An attribute utilized for purposes of bypassing code flows, may be implemented in a variety of ways. One way is as a variable (e.g., substitute variable) present within the code.

As further described in connection with the example below, in certain embodiments a bypass may be set to the code flow call.

FIG. 1B is a simplified flow diagram showing a method 150 of selectively bypassing code flows of a software program according to an embodiment. In a first step 152, a user input is received.

In a second step 154, in response to the input an attribute of the code flow is changed to result in bypassing of execution of the code flow.

In a third step 156, the code flow is displayed in an interface indicating a bypassed status of the code flow.

In an optional fourth step 158, an entry in a trace log is generated indicating the bypassing of execution of the first code flow.

Further details regarding the bypassing of code flows in software programs according to embodiments, are now provided in connection with the following example.

Example—Bypassing Code Flow(S) in ETL Job

SAP SE ("SAP") of Walldorf, Germany is a purveyor of databases that are organized according to a particular structure. Such databases may be populated with relevant data from outside sources that are organized according to different principles.

Figure 2:
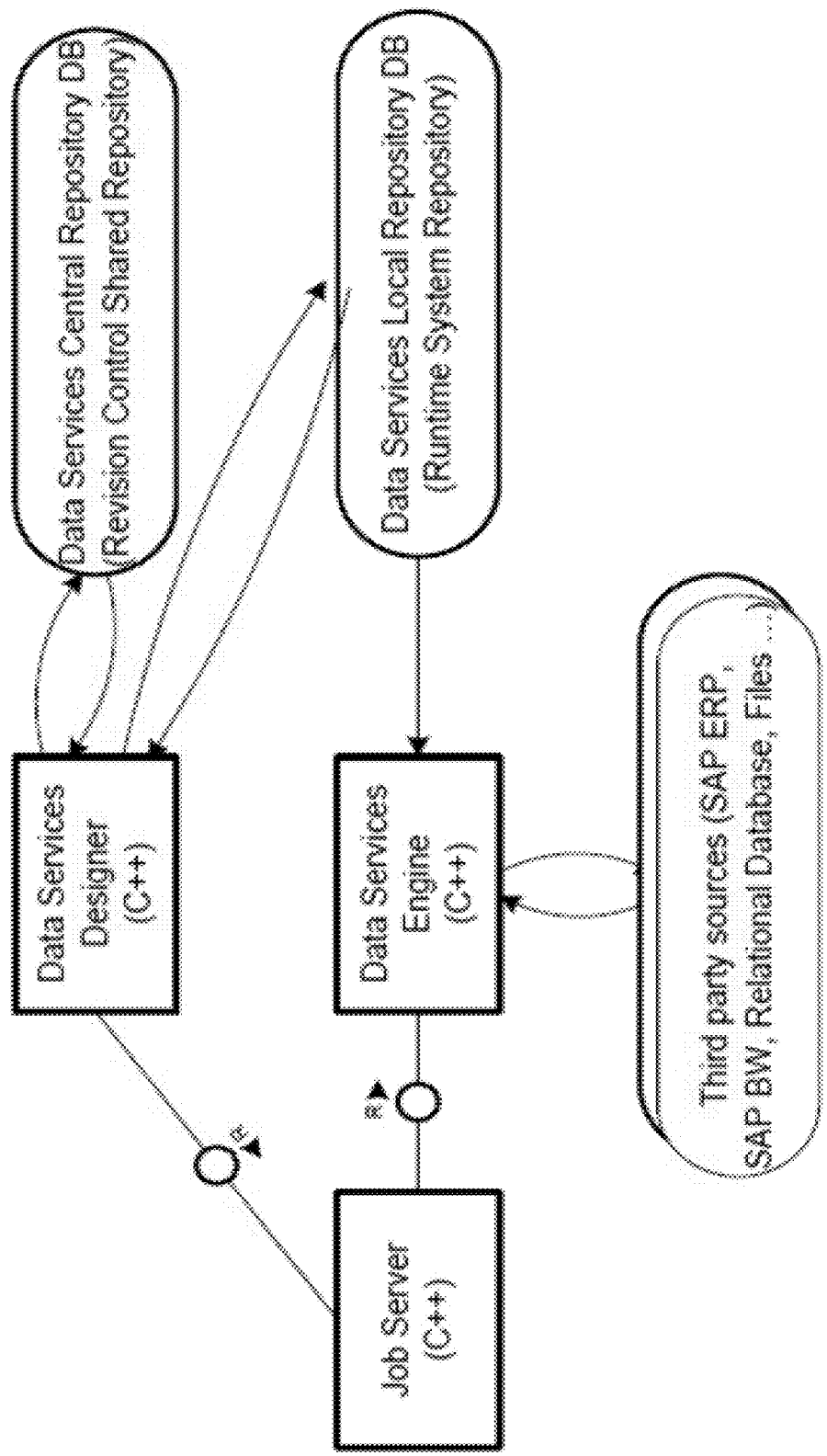
FIG. 2 is a simplified block diagram of a system utilized for Extraction, Transformation, Loading (ETL) of data in a SAP database environment.

The Extract, Transform, and Load (ETL) process describes the manner by which such outside data is (E)xtracted from external sources, (T)ransformed into a format recognizable by an underlying target database, and then (L)oaded into that target database. FIG. 2 is a block diagram showing a simplified view of an ETL system architecture provided by SAP.

The Designer component of the system of FIG. 2 is used to model an ETL Process known as an ETL job.

The Engine component is a transformation engine which is used to execute the ETL job. The engine may also be utilized to recognize and/or modify bypass attributes present in the code flows.

The Job Server component receives the request to execute ETL job and launch the engine. It also manages job's trace log, monitoring log, and error log.

The Local repository is a defined set of database tables to store its ETL modeling language (ATL), metadata of source, and target objects.

Designer generates ETL modeling language and metadata, and stores in the repository. The Engine reads the ETL modeling language from repository, creates runtime objects, and executes ETL jobs.

The Central repository is used as a version control system and shared repository. It is used by production, Quality Assurance (QA), and developers, to transport ETL language from one environment to other (e.g., as part of Lifecycle Management).

The software programs created for ETL processes are lengthy and complex, involving basic functions organized into code flows in the form of dataflows and workflows. An ETL dataflow maps source data to target data by transforming along the dataflow from a source to the target database. The dataflow captures ETL process business logic, allowing a user to employ built-in transformations, custom transformations, built-in functions and custom functions, source objects, and target objects.

A workflow is another type of code flow utilized in ETL software programs. An ETL workflow defines the flow of dataflows. A workflow may utilize one or more of the following constructs to manage flow:
script functions (multi step instructions)
conditional blocks
while loops.

Owing to their length and complexity, development of ETL software programs may involve the insertion of code flows serving testing and/or development purposes only. In order to prevent their operation from interfering with accurate execution of the ETL software, such development/testing code flows must be disabled prior to releasing the software for general usage.

Figure 3A:
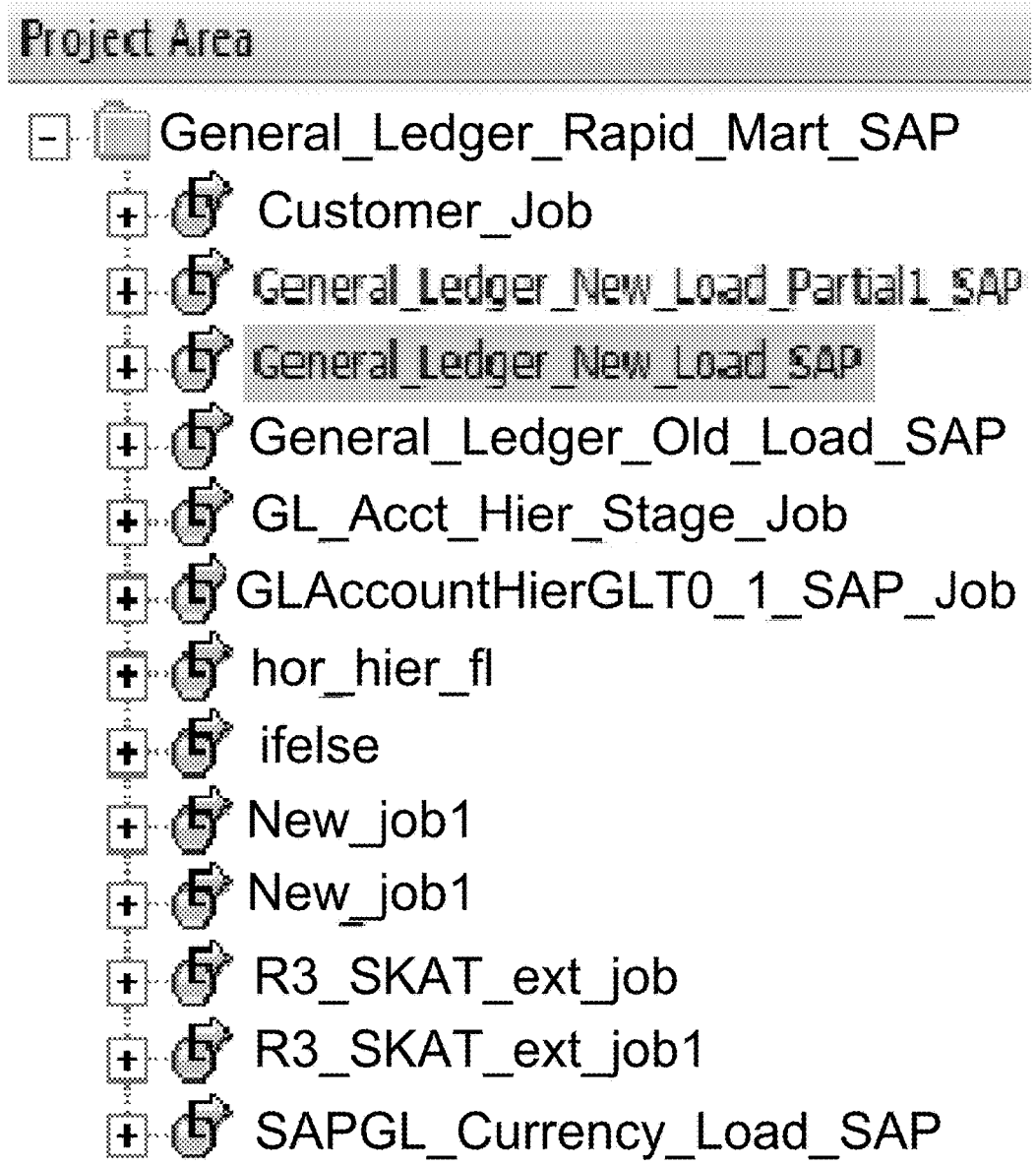
FIGS. 3-3E are screen shots of an interface showing bypass functionality for code flows in an example involving an ETL software program.
Figure 3B:
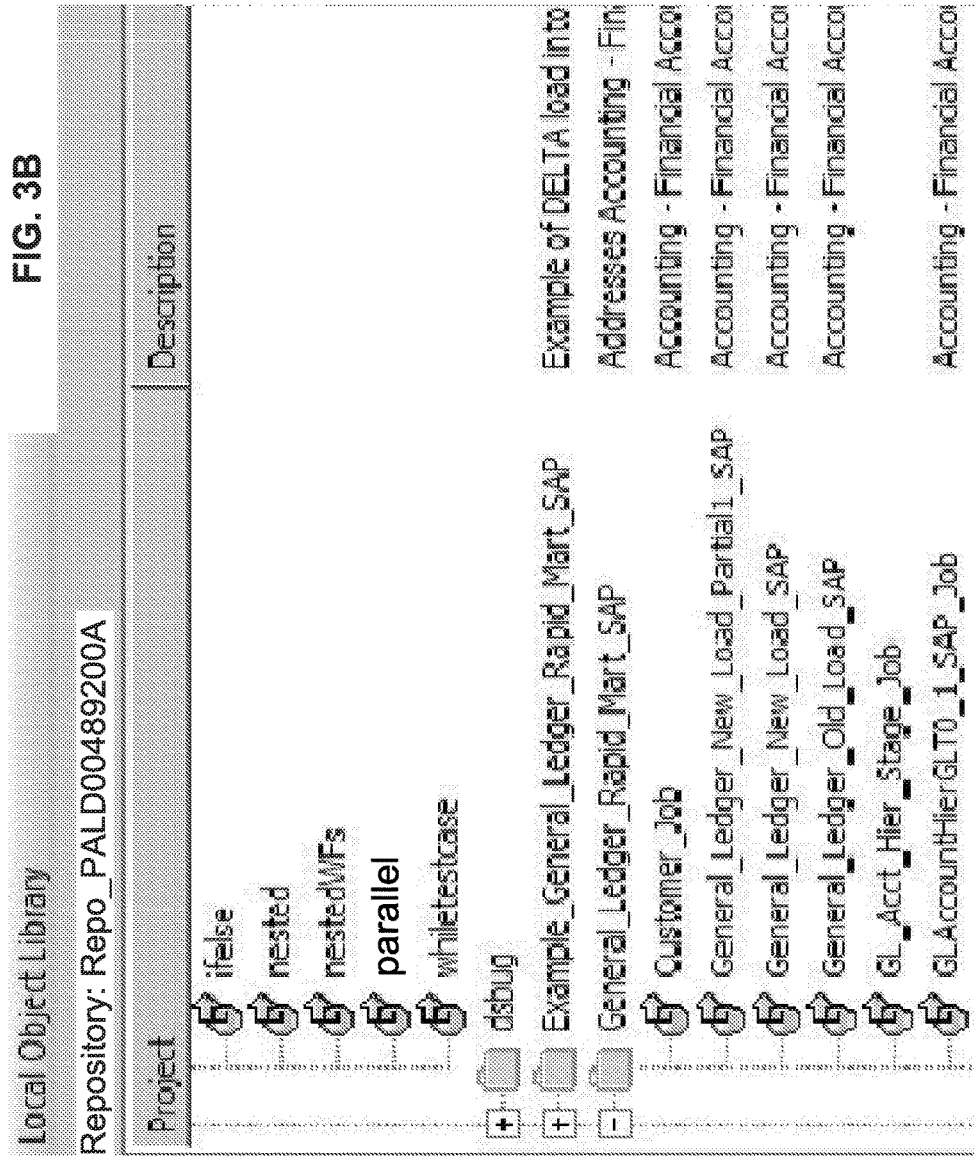
Figure 3C:
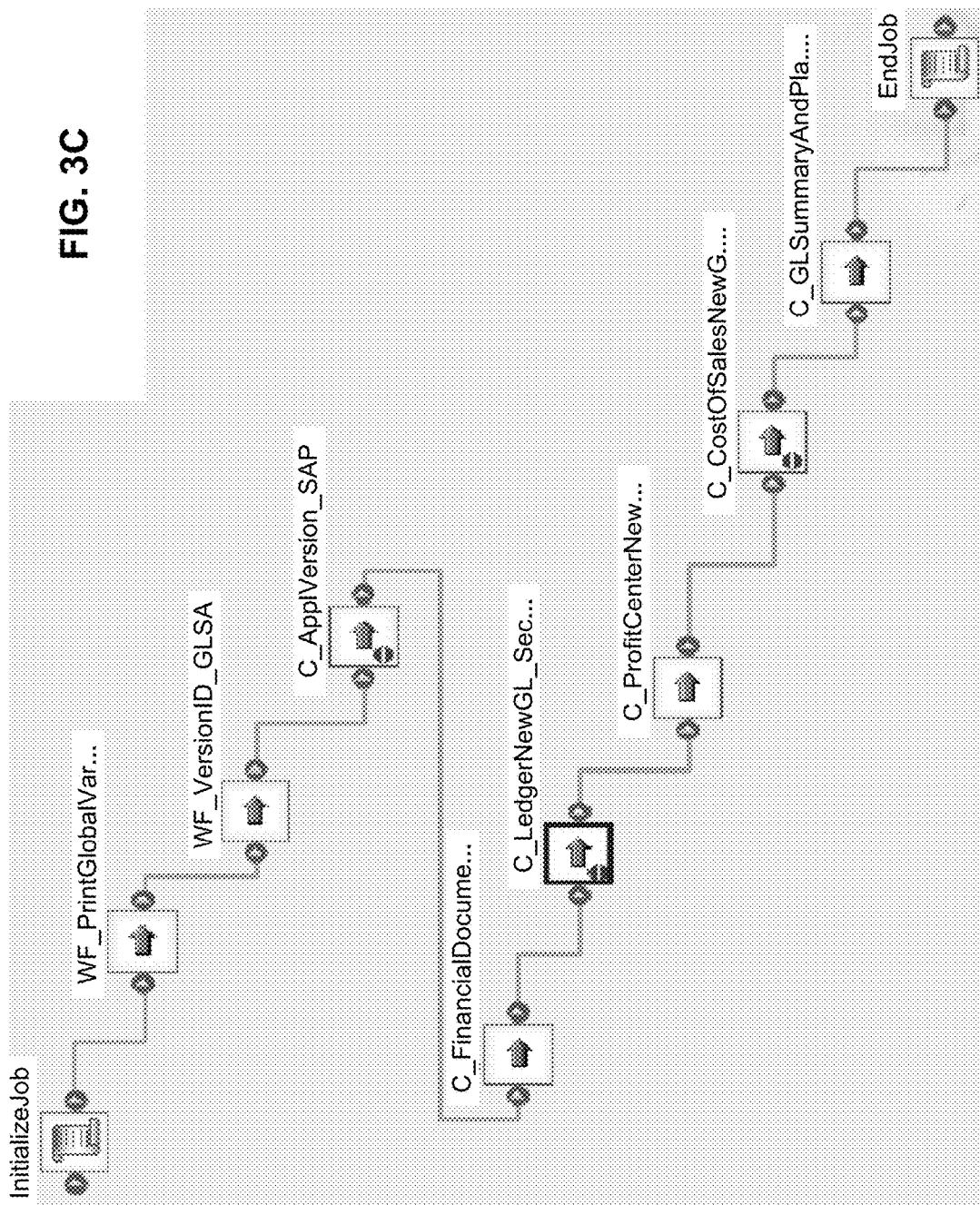

Accordingly, FIGS. 3-3C show the implementation of bypass attributes for a SAP ETL software program according to an embodiment. The software program according to this example is configured to perform ETL of financial information, for example as may be contained in a General Ledger (GL) source.

FIG. 3 shows a general overview of a Graphic User Interface (GUI) comprising a Project Area window (FIG. 3A), and a Local Object Library (FIG. 3B).

The third GUI window of FIG. 3C shows a series of code flows for an ETL job for the General_Ledger_New_Load_SAP file of the window of FIG. 3A. As indicated by the "do not enter" symbol in particular icons of the window of FIG. 3C, the developer has selected certain code flows (e.g., "C_ApplVersion_SAP"; "C_LedgerNewGL_Sec . . . "; and "C_CostofSalesNewG . . . ") that are to be bypassed during operation of the ETL job.

In particular, the value of the bypass attribute can be "yes" to turn on, or any other value to be turned off. This value is also applicable to the substitution parameter if user chooses to use the substitution parameter.

In this particular example, the bypassed flow will not be executed, but will be logged. An example log entry is "dataflow _____ is bypassed".

Some embodiments may utilize a substitution variable. There, a developer can select the substitution variable [$$BYPASS] and set the [$$ByPass] to 'yes' in order to provide the bypass option.

In certain embodiments, the bypass is set only to the dataflow/workflow call. As an example, consider the "REFRESH_BALANCE_T . . . " set. The language (ATL) for this call dataflow is shown below:
CALL DATAFLOW
REFRESH_BALANCE_TYPE_ODS::'bd6bed78-042b-48f7-bfe3-c1b544a31894'( )SET(bypass='[$$BYPASS]');

In order to support 'bypass' in workflow and dataflow, the Designer component adds the "Bypass" into the General properties page. In the General tab, a developer can select [$$BYPASS] or enter 'yes' to activate it. By default the 'bypass' value is empty (thereby ensuring execution of all code flows unless otherwise indicated).

A developer can define many different substitution variables to enable or disable the bypass. The variable is not necessary to be [$$BYPASS]. A developer can define other substitution variables.

Figure 3D:
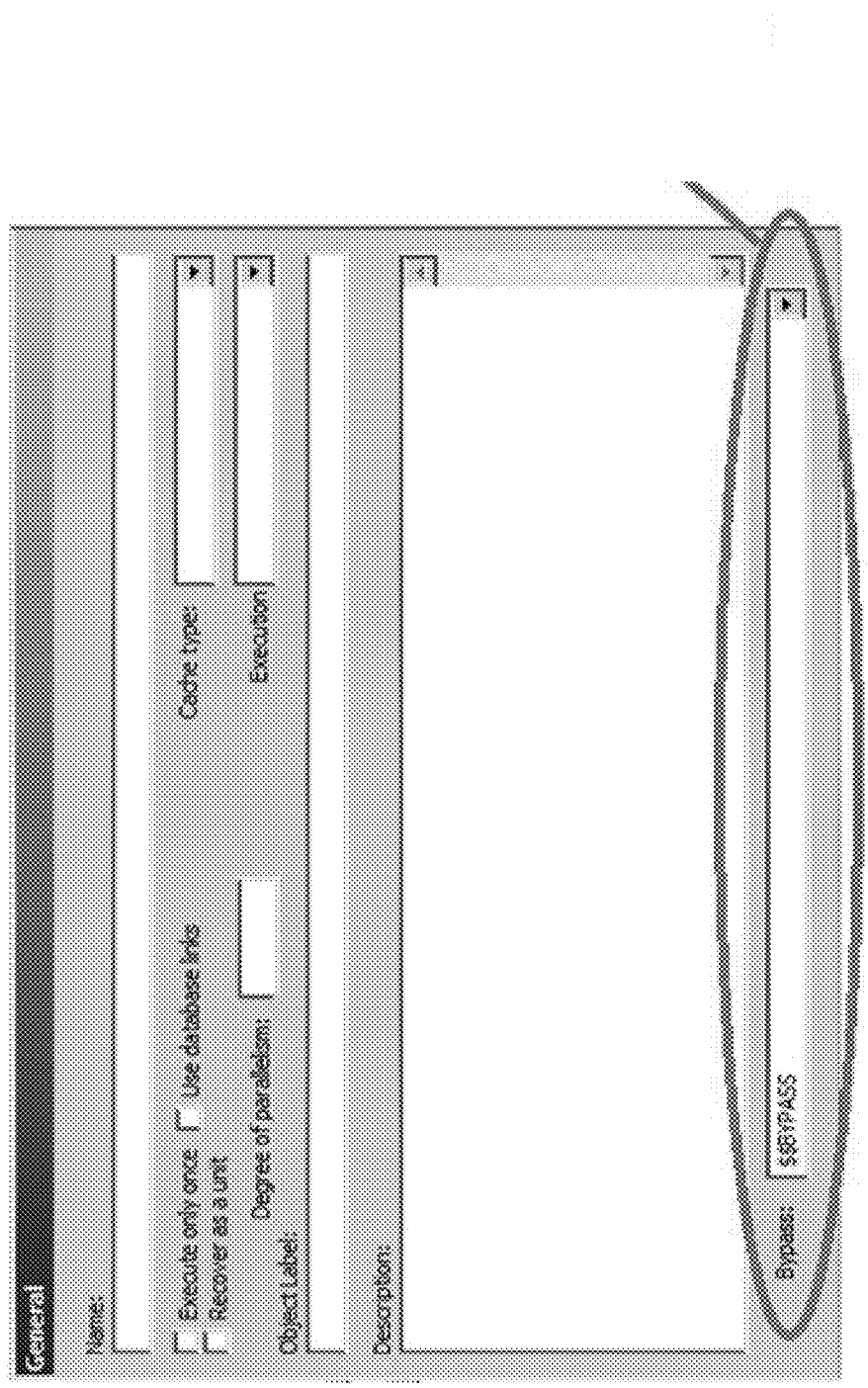
Figure 3E:
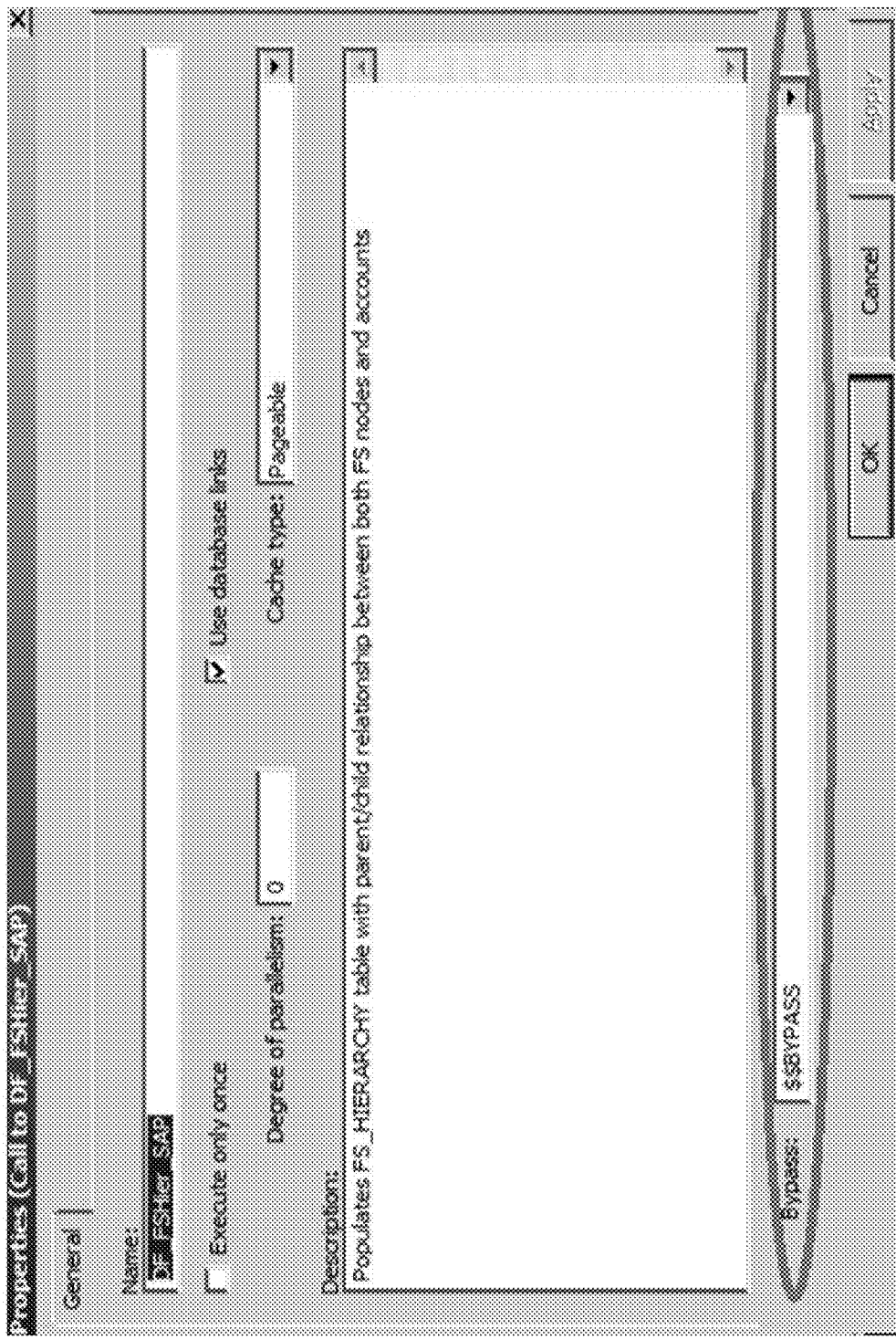

FIG. 3D shows a screenshot for setting a workflow property to implement a bypass attribute. FIG. 3E shows a screenshot for setting a dataflow property to implement a bypass attribute.

The Designer component may help a developer readily identify those ETL workflows and dataflows having the bypass attribute set. In particular, the developer may navigate to the Validation Window in the Designer component.

The Designer component will indicate the dataflows and/or workflows that are set to bypass. This process is similar to how the Designer system indicates errors during validation, allowing a developer to click on the link to move to each of object and correct them.

To summarize, in this example providing a bypass attribute allows a developer to specify a specific workflow or dataflow to be bypassed via the Designer system during ETL design time. Once the programmer has completed the design, he/she can easily turn off the bypass mode.

Code flow bypass approaches according to embodiments, afford the programmer with the benefit of speeding up debugging process, and saving the cost of time to re-run every workflow or dataflow when the changes only affect certain code flows.

Thus a programmer no longer needs to rely upon removable if/else codes in order to bypass a code flow. The programmer can instead utilize the current Design system without deleting/modifying the code, simply by disabling the bypass attribute.

It is noted that the bypass attribute can operate according to a parallel or a sequential scenario. In the latter, all code flows downstream of the attribute are also bypassed.

Figure 4:
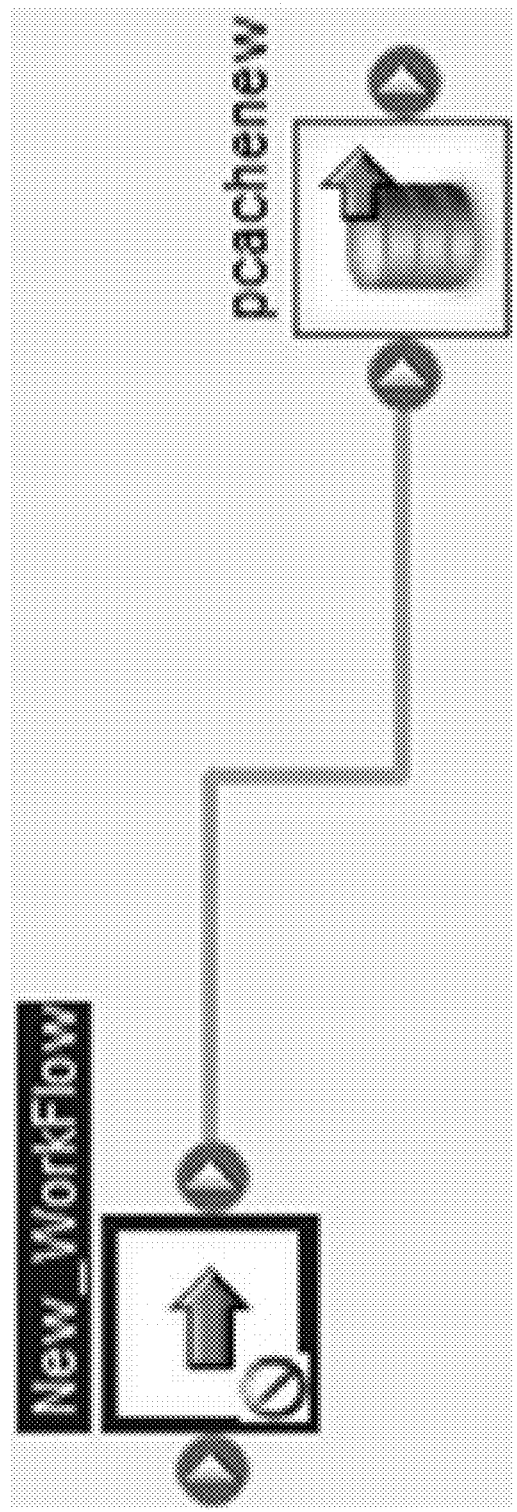
FIG. 4 shows an example of a nested use case.

A use case involving a nested work flow is now described in connection with FIG. 4. Where Workflow "New_WorkFlow" has conditional case and within the condition case, it has the Workflow "testwf"/testwf2 within IFELSE statement.

"New_WorkFlow" Workflow and "pachenew" dataflow get bypassed since "New_WorkFlow" is bypassed, therefore it stops to traverse its children. The "pachenew" dataflow has been parsed, but since it is downstream it is logged as bypass.

An If Else use case is now discussed. Both Data Flows may be marked as "bypass" in an IFELSE scenario.

A While loop use case is now discussed. In an example, a "pwdf" code flow is marked as bypass. The "loop" script basically increment SP_COUNT by 1 each time. It will only execute the script "loop" until the condition ($SP_COUNT)<=SP_MAX) is reached. The log indicates the "pwdf" dataflow is bypassed.

In a continuous workflow, the log indicates that the continue workflow is bypassed because the bypass attribute is set.

Specific implementation in the SAP ETL Design system is now discussed. The current parser object does not provide the SET command for the CALL object. Also, the current backend does not have awareness it is from parallel and downstream when running processStepBlock.

One of the requirements is to take out the bypass object before execution. Therefore, there are some required changes in the processStepBlock which takes the object out before processing the step. The current framework processes the parser object BFS and executes the step in depth first search. Therefore for the downstream scenario, it is easier to flag the subsequent objects not to be processed.

For the parallel scenario, during processing the step it has no info whether it is parallel or downstream scenario. Therefore some modification on how to process the steplist may be employed.

Parsing is Business Document Services (BDS) first, and then process step is Distributed File Sharing (DFS) during process step.
a. Update parser objects to support PLAN set_command
b. add bypass option in repo
c. Remove the objects from the StepList before DFS step execution.
d. Required to pass the parallel or not during processing the steplist.

Figure 5:
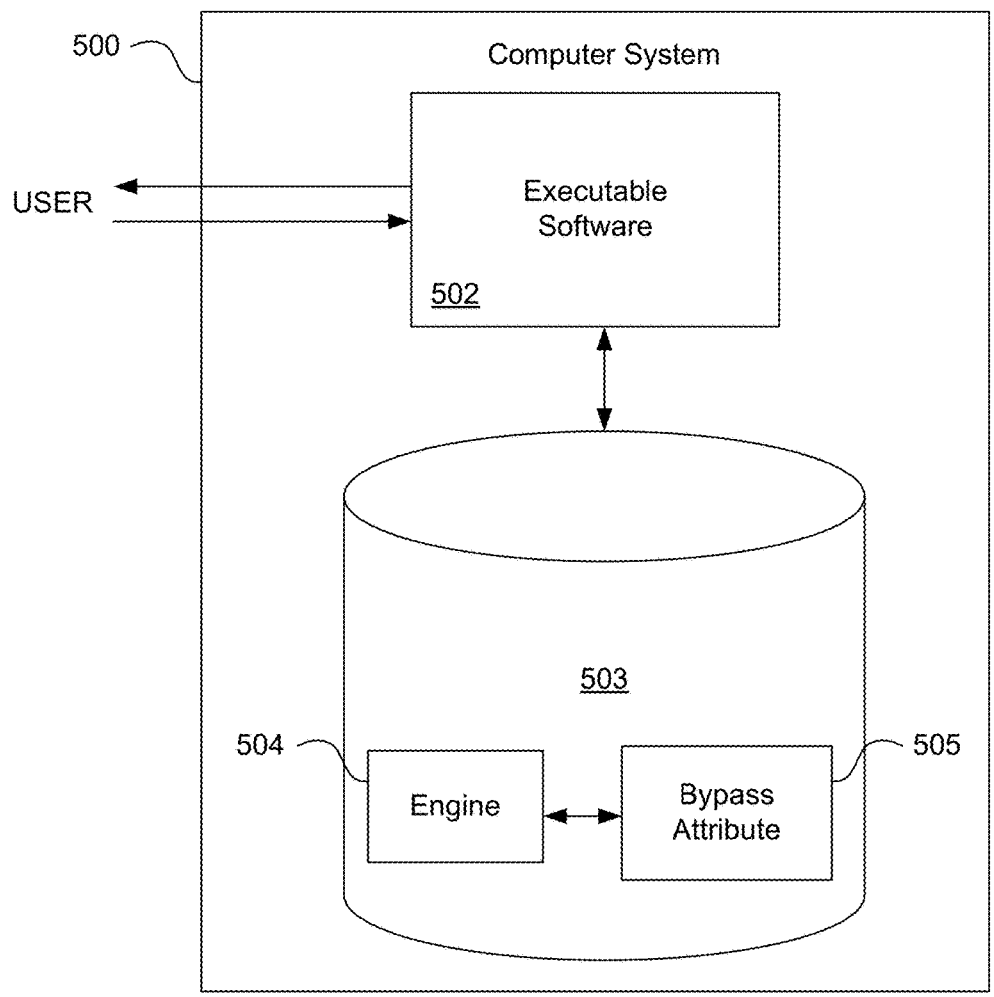
FIG. 5 illustrates hardware of a special purpose computing machine configured to allow selective bypassing of code flows according to an embodiment.

FIG. 5 illustrates hardware of a special purpose computing machine configured to implement selective bypass of code flows according to an embodiment. In particular, computer system 501 comprises a processor 502 that is in electronic communication with a non-transitory computer-readable storage medium 503. This computer-readable storage medium has stored thereon code 505 corresponding to a bypass attribute. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of the database. Such an embodiment can correspond to applications where processing is performed by a powerful engine available as part of an in-memory database (e.g., the HANA in-memory database available from SAP SE of Walldorf, Germany). However this is not required and in certain embodiments the engine may be implemented in other ways, for example as part of an overlying application layer.

Figure 6:
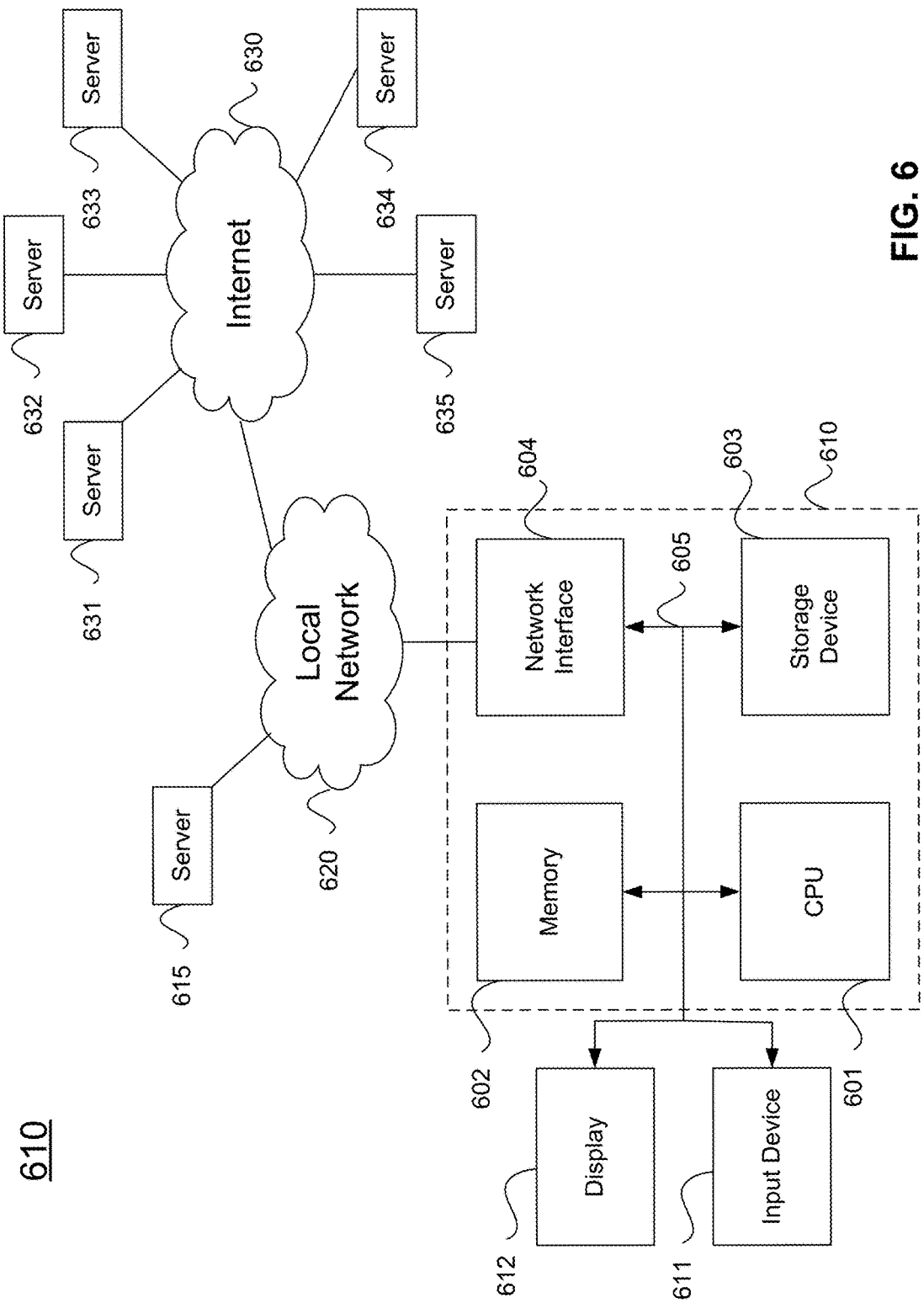
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 2511 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an in-memory database engine of an in-memory database in communication with a local data object repository and a first bypass attribute of a first code flow of a process of Extract, Transform, and Load (ETL) into the in-memory database;
   the in-memory database engine receiving a user input;
   in response to the user input, the in-memory database engine changing the first bypass attribute to indicate that execution of the first code flow is to be bypassed, wherein changing the first bypass attribute in a parallel mode of operation does not also result in bypassing of execution of a second code flow downstream of the first code flow;
   the in-memory database engine displaying the first code flow in an interface including an icon indicating a status that the first code flow is to be bypassed;
   the in-memory database engine adding a bypass option to the local data object repository;
   in the parallel mode of operation, the in-memory database engine bypassing the first code flow;
   the in-memory database engine generating an entry in a trace log indicating the bypassing of execution of the first code flow;
   after bypassing the first code flow, the in-memory database engine removing a bypass object; and
   after removing the bypass object, the in-memory database executing the first code flow to perform the process of ETL into the in-memory database.

2. A method as in claim 1 wherein the first bypass attribute comprises a substitution variable.

3. A method as in claim 1 wherein the first bypass attribute comprises a code flow call.

4. A method as in claim 1 wherein the first code flow is present within a loop.

5. A method as in claim 1 wherein the first code flow is nested.

6. A non-transitory computer readable storage medium embodying a computer program for performing a method, said method comprising:
   displaying an interface comprising a first code flow comprising a process of Extract, Transform, and Load (ETL) and a second code flow downstream of the first code flow, the first code flow and the second code flow stored in an in-memory database;

an in-memory database engine in communication with a local data object repository and a first bypass attribute of a first code flow stored in the in-memory database;

the in-memory database engine receiving a user input;

in response to the user input, the in-memory database engine changing the first bypass attribute to indicate that execution of the first code flow is to be bypassed, wherein changing the first bypass attribute in a parallel mode of operation does not also result in bypassing of execution of the second code flow;

the in-memory database engine displaying the first code flow in the interface including an icon indicating a status that the first code flow is to be bypassed;

the in-memory database engine adding a bypass option to the local data object repository;

in the parallel mode of operation, the in-memory database engine bypassing the first code flow;

the in-memory database engine generating an entry in a trace log indicating the bypassing of execution of the first code flow;

after bypassing the first code flow, the in-memory database engine removing a bypass object; and after removing the bypass object, the in-memory database executing the first code flow to perform the process of ETL into the in-memory database.

7. A non-transitory computer readable storage medium as in claim 6 wherein the first bypass attribute comprises a substitution variable.

8. A non-transitory computer readable storage medium as in claim 6 wherein the first bypass attribute comprises a code flow call.

9. A computer system comprising:
one or more processors;
a software program, executable on said computer system, the software program configured to cause an in-memory database engine stored in an in-memory database to:
communicate with a local data object repository and display an interface comprising a first code flow of a process of Extract, Transform, and Load (ETL) and including a first bypass attribute, and a second code flow downstream of the first code flow, the first code flow and the second code flow stored in the in-memory database;
receive a user input;
in response to the user input, change the first bypass attribute to indicate that execution of the first code flow is to be bypassed, wherein changing the first bypass attribute in a parallel mode of operation does not also cause bypassing of execution of the second code flow;
displaying the first code flow in the interface including an icon indicating a status that the first code flow is to be bypassed;
adding a bypass option to the local data object repository;
in the parallel mode of operation, bypassing the first code flow to generate an entry in a trace log indicating the bypassing of execution of the first code flow;
generate an entry in a trace log indicating the bypassing of execution of the first code flow;
after bypassing the first code flow, remove a bypass object; and
after removing the bypass object, execute the first code flow to perform the process of ETL into the in-memory database.

10. A computer system as in claim 9 wherein the first bypass attribute comprises a substitution variable.

11. A computer system as in claim 9 wherein the first bypass attribute comprises a code flow call.

* * * * *